United States Patent [19]

Dagenais

[11] 4,278,391
[45] Jul. 14, 1981

[54] PROTECTION MEANS FOR TRACKS IN A TRACK-LAYING VEHICLE

[76] Inventor: Joseph E. Dagenais, 3712 17th Ave., Vernon, B.C., Canada

[21] Appl. No.: 16,897

[22] Filed: Mar. 2, 1979

[51] Int. Cl.³ .......................... B66C 1/42; B60R 19/04
[52] U.S. Cl. .................................... 414/559; 280/762; 293/102; 305/12; 414/569
[58] Field of Search ....................... 414/538, 569, 559; 212/7; 293/102, 126; 280/762; 305/12, 15, 60

[56] References Cited

U.S. PATENT DOCUMENTS

| | | | |
|---|---|---|---|
| 1,697,970 | 1/1929 | Decker | 280/762 |
| 1,838,222 | 12/1931 | Grage | 305/12 X |
| 3,265,428 | 8/1966 | Gilbert | 414/538 X |

Primary Examiner—Robert G. Sheridan
Attorney, Agent, or Firm—Kolisch, Hartwell & Dickinson

[57] ABSTRACT

An assembly for protecting the tracks in a track-laying logging vehicle against impact damage and derailment. The assembly includes, for each track, a bumper located adjacent and extending across the rear of the track, a fender anchored to the bumper and forming a protective apron over the rear end of the track, and front and rear lateral guides for preventing outward derailment of the track. The track fenders are configured both to assist in log loading, and in supporting the ends of a bundle of loaded logs during transport.

3 Claims, 3 Drawing Figures

PROTECTION MEANS FOR TRACKS IN A TRACK-LAYING VEHICLE

BACKGROUND AND SUMMARY OF THE INVENTION

This invention relates to means for protecting the tracks in a track-laying logging vehicle—such means including for each track a rear bumper, a rear fender, and lateral track guide plates.

Very often during operation of such a vehicle, debris and other objects become lodged between the tracks and the sprockets therefor—inhibiting free movement of the tracks, and causing damage and derailment.

Another concern is that, when operating such a vehicle in reverse, driver carelessness and/or obscured rear view often result in ramming of the tracks into obstacles. This, of course, can damage rear idlers, and possibly cause derailment.

The kind of vehicle with respect to which the present invention is contemplated for use is employed in logging operations where logs, or more particularly, the ends of bundles of logs, are hoisted, and a bundle is dragged from one place to another. Such dragging is accomplished by attaching cables which extend from the vehicle to such log ends, hoisting these ends off the ground, and then transporting the logs. The raised log ends, under such circumstances, hang loosely from the cables—with the opposite ends of the logs resting on the ground.

Under such circumstances, it is often the case that the raised log ends bump and snag against the rear portions of the tracks as they are being hoisted, and also as the logs are being dragged, with such action causing debris, for example loose tree bark and chipped wood, to lodge in the tracks, and to cause track derailment.

If a track becomes damaged, or derails, it is necessary for the operator to stop the vehicle and to repair damage. Such, obviously, slows down a logging operation, is inconvenient, and also costly.

A general object of the present invention, considering all of the above-mentioned situations, is to provide satisfactory means for protecting the tracks in such a vehicle against wear, tear and derailment.

More particularly, an object of the invention is to provide, for each track, a pair of guide plates disposed outwardly of the track, with one adjacent the front and the other adjacent the rear of the track. Such plates inhibit complete derailment of a track.

Still another object of the invention is to provide such protection means which also includes structure for preventing damage to rear idlers. Proposed according to this object of the invention, for each track, is a bumper attached to the vehicle's frame and extending substantially horizontally adjacent the inside and the rear of each track.

Further included in the invention, for each track, is a fender which forms a protective apron extending over the rear end of the track. Each fender is anchored both to the vehicle's frame and to the associated bumper.

With such construction, the fenders, in addition to providing overhead protection for the rear ends of the tracks, also function cooperatively with the bumpers to form an upwardly facing, generally horizontal support surface for the raised ends of loaded logs. More particularly, this support surface is shaped, as will below be explained, to facilitate log hoisting, and also to provide a place of rest for raised log ends during a transporting operation. With such support made available, breakage in the cables that are used to lift the logs is substantially eliminated.

These and other objects and advantages which are attained by the invention will become more fully apparent as the description which now follows is read in conjunction with the accompanying drawings.

DETAILED DESCRIPTION OF THE INVENTION

Figure 1:
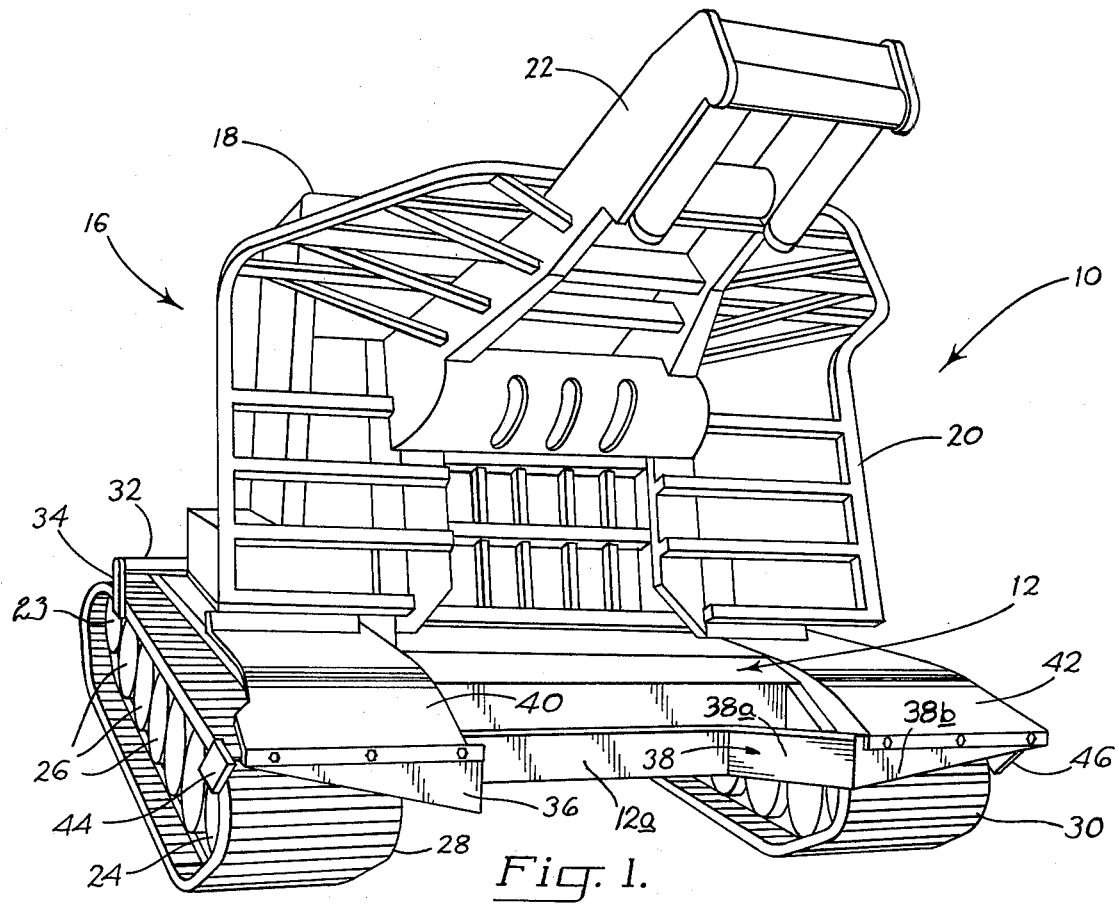
FIG. 1 is a perspective rear view of a logging tractor showing protective framework, a hinged boom with fairleads, and track-protecting means employed according to the invention.
Figure 2:
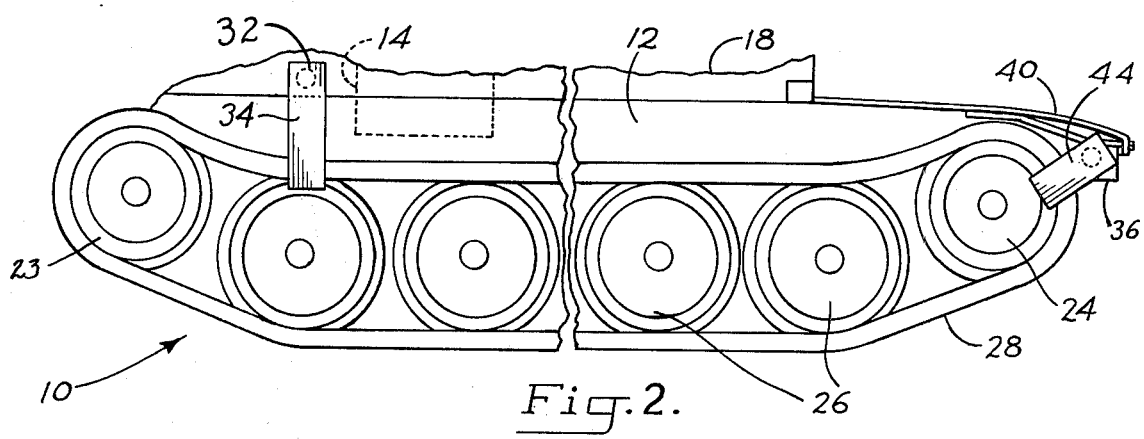
FIG. 2 is a fragmentary, left-side elevation of FIG. 1.

Turning now to the drawings, and referring first to FIGS. 1 and 2, indicated generally at 10 is a logging tractor, or track-laying vehicle. The tractor includes the usual frame 12 having a laterally extending rear frame member 12a. The tractor also includes an engine 14, shown in dashed lines in FIG. 2, an operator station with the usual protective cage shown at 18 adjacent the approximate center of the frame, a log-handling subframe 20 carried by the usual vertically swingable, hinged boom 22 which carries the usual winches, cables, and fairleads, all located adjacent the rear of the tractor.

Suitably mounted on and distributed along frame 12, on opposite sides of the tractor, are conventional arrangements of power-driven sprockets, idler sprockets, and road wheels, including a pair of front power-driven sprockets, such as sprocket 23, rear idlers, such as idler 24, and road wheels, such as wheels 26. Trained over these sprockets, idlers and wheels in the usual manner along each side of the tractor are two conventional endless tracks shown at 28, 30.

Joined to the tractor's frame, in a manner which will now be described, is track-protecting apparatus which constructed in accordance with the present invention.

Referring particularly to FIGS. 1 and 2, means for protecting the front portion of the tracks, adjacent where the same are trained over the front-most sprockets, includes elongated support members, such as support member 32 (associated with track 28), mounted in any suitable manner, as by welding, on the forward portion of frame 12, and extending substantially horizontally outwardly over the track. Joined detachably to and extending downwardly from the outer ends of these support members, are guide plates, such as guide plate 34 on member 32. These plates extend alongside the outside forward edges of the upper portions of the tracks.

Figure 3:
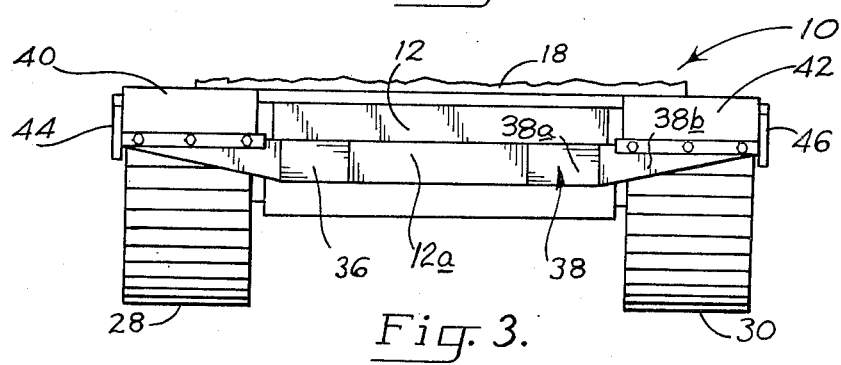
FIG. 3 is a fragmentary, right-side elevation of FIG. 2.

Referring now to all of the drawing figures, and considering in detail the track-protecting means provided for rear portions of tracks 28, 30, such includes a pair of bumpers 36, 38, respectively, a pair of fenders, 40, 42, respectively, and a pair of lateral guide plates 44, 46, respectively. Bumpers 36, 38 are mounted on the rear portion of frame 12 in any suitable manner, and extend adjacent the insides and across the rear ends of tracks 28, 30. With reference to FIGS. 1 and 3, bumper 38, which is representative, includes an angled mounting portion 38a which is attached, as by welding, to the associated side of member 12a, and a bumper portion 38b extending horizontally across the rear of track 30. Portion 38a extends along the inner rear side of track 30. Fenders 40, 42 have a somewhat downwardly curved, sheet-like construction, and are suitably removably fastened both to frame 12 and to the bumper portions of bumpers 36, 38 to extend in a protective apron-like fashion immediately over the upper rear portions of tracks 28, 30.

Guide plates 44, 46 are similar in construction to the earlier-mentioned guide plates, and are suitably detachably mounted on the outer ends of bumpers 36, 38. The lower ends of these plates extend alongside the outside edges of tracks 28, 30 where the same are trained over the rear idlers.

Considering now how the apparatus of the invention performs, when a load of logs, more particularly a bundle of logs, is to be transported from one location to another, one or more cables are extended from boom 22 through the fairleads therein, and are suitably attached to one set of ends of the logs in the bundle. Through operation of conventional winch mechanism in the tractor, the bundle is then lifted and pulled toward and upwardly over the rear ends of the tracks. In the event that the operator does not sufficiently raise the bundled ends, there is no likelihood that these will ram into the rear end of the tracks, inasmuch as bumpers 36, 38 stand in the way. Further, there is no likelihood that the logs will drag over the upper ends of the tracks, inasmuch as fenders 40, 42 provide protective aprons over such ends. And, with the fenders having the downwardly curved configuration mentioned earlier, should the log ends be low enough, the upper surfaces of the fenders function as guides for guiding the ends of the logs in place over the tracks. The upper surfaces of the fenders also function to provide an underlying support surface for a log bundle when the same is being dragged.

With specific reference to transporting a log bundle, and with the upper surfaces of the fenders providing overhead protection for the rear ends of the tracks, movement of the tracks does not result in any chewing-up of the ends of the logs, and thus the problem of debris accumulation from such chewing is avoided.

The lateral guide plates provided adjacent the upper front and rear ends of the tracks inhibit any tendency of the tracks to derail.

Another obvious advantage of the invention is that bumpers prevent back-up ramming of the tracks and damage to the rear idlers.

It will be obvious to those skilled in the art that the various components of the present apparatus are readily mountable on a wide variety of conventional track-laying logging vehicles, without requiring any substantial modification of the latter. Detachable mounting, preferably provided for the lateral guide plates and for the fenders, affords quick access to other parts in the tractor for servicing and maintenance purposes.

The construction proposed for the various parts of the apparatus is obviously extremely simple, and therefore the same can be added to a vehicle with relatively low cost and with little time expenditure. Significantly, this extremely simple and low-cost protective apparatus conveniently and effectively avoids a number of extremely serious maintenance, wear and damage problems encountered in the absence of such protection.

While a preferred embodiment of the invention has been described herein, it is appreciated that various modificiations and changes may be made by one skilled in the art without departing from the spirit of the invention.

It is claimed and desired to secure by Letters Patent:

1. Apparatus for use in a vehicle having a pair of laterally spaced endless tracks, a frame member extending laterally between rear portions of the tracks, and a rear load-hauling assembly for pulling a load of logs and the like at an elevated position toward the rear of the vehicle, said apparatus comprising, bumper means adapted to be mounted on the frame member and including, for each track, a bumper portion extending substantially horizontally across the rear of the track, and a mounting portion extending along an inner side of the track, a fender mounted on each of said bumper portions and extending from that bumper portion rearwardly over a rear portion of the associated track and terminating forwardly adjacent the load-hauling assembly, each fender defining a log-support surface which is curved upwardly progressing forwardly, and which is disposed above said mounting portion, and a track guide mounted on each of said bumper portions, outwardly of the associated fender, and cooperating with the associated mounting portion of confine the rear portion of the track to a lateral position therebetween.

2. The apparatus of claim 1, which further includes, for each track, a pair of guide plates adapted to be mounted on the vehicle outwardly of the track, adjacent of front thereof, cooperating with said track guide to prevent track derailment.

3. The apparatus of claim 1, wherein said fender is detachably mounted on the associated bumper portion.

* * * * *